(12) United States Patent  
Sullivan

(10) Patent No.: US 6,549,929 B1
(45) Date of Patent: Apr. 15, 2003

(54) INTELLIGENT SCHEDULED RECORDING AND PROGRAM REMINDERS FOR RECURRING EVENTS

(75) Inventor: Gary E. Sullivan, Mansfield, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/324,156

(22) Filed: Jun. 2, 1999

(51) Int. Cl.[7] ............... G06F 9/00; H04N 5/50; H04N 5/445
(52) U.S. Cl. ............ 709/102; 725/28; 725/39; 725/109
(58) Field of Search ............... 386/83; 725/28, 725/39, 109; 709/102

(56) References Cited

U.S. PATENT DOCUMENTS

| | | | |
|---|---|---|---|
| 4,115,846 A | 9/1978 | Laine | 364/200 |
| 4,697,209 A | 9/1987 | Kiewit et al. | 358/84 |
| 4,706,121 A | 11/1987 | Young | 358/142 |
| 4,949,251 A | * 8/1990 | Griffin et al. | |
| 5,113,380 A | * 5/1992 | Levine | |
| 5,151,789 A | 9/1992 | Young | 358/194.1 |
| 4,706,121 A | 12/1993 | Young | 358/142 |
| 5,353,121 A | 10/1994 | Young et al. | 348/563 |
| 5,532,754 A | 7/1996 | Young et al. | 348/569 |
| 5,550,576 A | 8/1996 | Klosterman | 348/6 |
| 5,559,548 A | 9/1996 | Davis et al. | 348/6 |
| 5,629,733 A | 5/1997 | Youman et al. | 348/7 |
| 5,635,978 A | 6/1997 | Alten et al. | 348/7 |
| 5,686,954 A | 11/1997 | Yoshinobu et al. | 348/13 |
| 5,699,107 A | 12/1997 | Lawler et al. | 348/13 |
| 5,732,338 A | 3/1998 | Schwob | 455/158.5 |
| 5,751,282 A | 5/1998 | Girard et al. | 345/327 |
| 5,751,372 A | 5/1998 | Forson | 348/569 |
| 5,758,257 A | 5/1998 | Herz et al. | 455/2 |
| 5,760,821 A | 6/1998 | Ellis et al. | 348/10 |
| 5,801,753 A | 9/1998 | Eyer et al. | 348/13 |
| 5,801,787 A | 9/1998 | Schein et al. | 348/569 |
| 5,805,204 A | 9/1998 | Thompson et al. | 348/13 |
| 5,805,235 A | 9/1998 | Bedard | 348/569 |
| 5,844,181 A | * 12/1998 | Amo et al. | |
| 5,956,455 A | * 9/1999 | Hennig | 386/83 |
| 6,167,379 A | * 12/2000 | Dean et al. | |
| 6,177,931 B1 | * 1/2001 | Alexander et al. | 345/327 |
| 6,208,799 B1 | * 3/2001 | Marsh et al. | 386/83 |

FOREIGN PATENT DOCUMENTS

WO   WO9904561   1/1999

* cited by examiner

Primary Examiner—Emanuel Todd Voeltz
(74) Attorney, Agent, or Firm—Walter Malinowski; Mark S. Walker

(57) ABSTRACT

A user interface using program scheduling information for selecting programs and determining whether to schedule an event based on the program scheduling information associated with the selected program. The event is scheduled if the program name is in a predetermined time slot of the program scheduling information. Accordingly, if the program name is not in the predetermined time slot, the interface will not schedule an event, such as a recording or a program reminder, for the selected program. Further, if the interface determines the program name resides in a different time slot within the program scheduling information, the event will be rescheduled using the new time slot associated with the selected program within the program scheduling information.

37 Claims, 8 Drawing Sheets

INTELLIGENT SCHEDULED RECORDING AND PROGRAM REMINDERS FOR RECURRING EVENTS

CROSS REFERENCE TO RELATED APPLICATIONS

Field of the Invention

The present invention relates generally to systems using program scheduling information and, more particularly, to methods, systems, interfaces, software, and signals for selecting programs and determining whether to schedule an event based on comparing the selected program name to the program scheduling information.

BACKGROUND OF THE INVENTION

Program scheduling information is used extensively with TVs, VCRs, Convergence PCs, PC/TVs, and set top boxes for cable TVs to display scheduling information for a multitude of programs. As an example, the Gateway Destination PC-TV system from Gateway 2000, Inc. integrates a computer system with a TV and other devices and signals associated with TVs such as video cassette recorders (VCRs), audio components, laser disk drives, cable television signals, and satellite signals. Typically, scheduling information is transmitted by a service to a receiver contained in one of the aforementioned systems. The scheduling information can be contained within a carrier signal and the carrier signal transmitted, or propagated, through several different mediums. For example, the signal could propagate through air until it is received by a local satellite dish, whereupon it is transferred through a fiber optic cable to one of the above systems. The scheduling information received by the one of the mentioned systems typically contains information like a program name, day, date and time the program airs, the rating of the program, and even if the program is closed captioned for the hearing impaired. Additionally, the scheduling information could contain a summary describing the program and whether the program is available with foreign language subtitles. The above information, and potentially even more, is available to the viewer using program scheduling information in conjunction with one of the above systems.

A common use of program scheduling information with one of the above systems is to select a program and schedule an event in association with the selected program. Two common events are record and remind events. The record event uses a record function and the program scheduling information associated with a selected program to perform a record function. The record function allows the user to record a program at a future date using the selected program's information contained within the program scheduling information (i.e., channel, date, duration, etc.). The remind event allows the user to be reminded of a program that is about to air using the program scheduling information. The remind event uses a remind function and the program scheduling information associated with the selected program to perform a remind function. By selecting a program and scheduling an event in association with the program, the task of scheduling an event is greatly simplified.

As an example, suppose a user wanted to record a program that airs on a future date. The user would select a program and schedule a record event to record the program. Upon scheduling the record event, the record event will automatically be performed when the selected program airs on the future date. The task of recording a program is simplified in that the program scheduling information associated with the selected program is used to assist in scheduling the record event. The scheduling of a record event is analogous to the method used in manually programming a VCR to record a program on a future date, except in the case of scheduling a record event, all of the information for programming the VCR is contained in the program scheduling information associated with the selected program and is automatically contained in the scheduled event requiring minimal effort by the user. The remind event is similar to the record event except that when the selected program is about to air, the user would receive a reminder from the system instead of having the system actually recording the program.

Similar to record and remind events are periodically recurring record and remind events. Periodically recurring record and remind events are extensions of the record and remind events with the added feature of being able to record or remind at different recurring periodic intervals (i.e. daily, weekly). These periodically recurring events are useful for recording and reminding programs that air on a daily or weekly basis. For example, suppose a user wanted to schedule a weekly record event to record a program on a weekly basis. The user would select the desired program and then elect to have a weekly record event record the desired program on a weekly basis. The program would be automatically recorded every week in the same time slot until the user terminates the weekly record event. The weekly remind event is performed in a similar manner to the weekly record event except that instead of recording the program weekly, the user would be reminded weekly prior to the program airing that the program is about to air.

Several problems arise when a user "blindly" schedules a periodic event. The first problem that can occur is when a user sets up an event for recording/reminding a program on a weekly basis and the program is recorded/reminded regardless of what is actually being aired. As an example, suppose NBC's Seinfeld (NBC and Seinfeld are trademarks of the National Broadcast Company) is aired every Thursday from 8:00–8:30 P.M. CST, and the user decided to record the program by scheduling a weekly record event. By scheduling a weekly record event, the user has requested that the Seinfeld show be recorded every week in the same time slot, Thursdays between 8:00–8:30 P.M. CST as noted. However, suppose in one particular week when the time slot arrived, Seinfeld was replaced with live coverage of the Winter Olympics. A conflict occurs between what the user scheduled to be recorded and what is actually recorded. In this case, the user may possibly get a recording of the "Two-Man Bobsledding Event" and not the desired Seinfeld program (not that there is anything wrong with that, it just is not quite what the user had in mind).

A second problem may occur when the user wants to schedule a periodic event on a weekly basis, but the program may be either preceded by a special announcement or a program in the previous time slot that aired beyond the normal scheduled time slot. For example, suppose the user wants to record NBC's Frasier (Frasier is a trademark of the National Broadcast Company) every Wednesday night from 7:30–8:00 P.M. CST and elects to record the event automatically on a weekly basis by scheduling a weekly record event. Also, suppose that during one week on a Wednesday night the program time had slipped from 7:30–8:00 P.M. to 9:30–10:00 P.M. CST due to the President's "State of the Union Address." The recording of the Frasier program would be missed by the interrupting program, and the user would record the "State of the Union Address" (and possibly the rebuttal) instead of the desired Frasier program.

Both situations are unappealing to the user wanting to record or remind specific programs on a regular basis and avoid the recording/reminding of undesired programs due to schedule changes. What is needed is a method, system, interface, software, and signal to identify the program names of the programs being aired and to schedule events or reschedule events based on a determination of whether the name of the selected program is in the predetermined time slot of the program scheduling information.

SUMMARY OF THE INVENTION

Accordingly, the present invention provides a method in a system using program scheduling information, comprising the steps of selecting a program from the program scheduling information, comparing a program name for the selected program to the program scheduling information, and determining whether to schedule at least one event for the program for at least one predetermined time slot based upon the results of comparing the program name for the selected program to the program scheduling information.

In a preferred embodiment, the program name is used as a "tag" which provides the basis for comparisons and determinations. However, it is understood that any unique tag, such as a program identification number, may be used in place of the program name when practicing this invention. For example, if the name of a program is "Seinfeld" and this program's identification number is "12345", then the present invention may be modified to compare the desired identification number to the actually scheduled identification number, rather than conducting a comparison based solely upon the program name.

The present invention further provides a system comprising: at least one processor; memory operably coupled to the processor; and a user interface, including program scheduling information, configured to enable selection of a program from the program scheduling information, to compare a program name for the selected program to the program scheduling information, and to determine whether to schedule at least one event for the program for at least one predetermined time slot based upon the results of comparing the program name for the selected program to the program scheduling information.

The present invention further provides a computer readable medium tangibly embodying a program of instructions for a system using program scheduling information. The program of instructions implements the steps of selecting a program from the program scheduling information, comparing a program name for the selected program to the program scheduling information, and determining whether to schedule at least one event for the program for at least one predetermined time slot based upon the results of comparing the program name for the selected program to the program scheduling information.

The present invention further provides a signal embodied in a propagation medium in a system using program scheduling information. The signal comprises at least one instruction configured to select a program from the program scheduling information, at least one instruction configured to compare a program name for the selected program to the program scheduling information, and at least one instruction configured to determine whether to schedule at least one event for the program for at least one predetermined time slot based upon the results of comparing the program name for the selected program to the program scheduling information.

It is an object of the present invention to schedule an event based on the program name contained within the program scheduling information.

It is another object of the present invention to reschedule an event to a new time slot based on a determination that the program name is in the new time slot.

It is another object of the present invention to cancel a scheduled event based on comparing the program name to the program scheduling information.

It is another object of the present invention to notify a user of the system that a program has been canceled and/or rescheduled.

One advantage that the present invention provides is that an event will be scheduled after determining whether the program name is in the predetermined time slot of the selected program.

Another advantage that the present invention provides is that a scheduled event will be canceled if the program name does not match the program name in the program scheduling information.

Another advantage that the present invention provides is that a scheduled event can be automatically rescheduled to a different time slot using the program scheduling information.

Another advantage that the present invention provides is that resources will not be wasted to schedule and/or execute an event for a selected program not airing in its predetermined time slot.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of preferred embodiments, reference is made to the accompanying drawings. These embodiments are described in sufficient detail to enable those skilled in the art to practice the invention, and it is understood that other embodiments may be utilized, and that logical, mechanical or electrical changes may be made without departing from the spirit or scope of the invention. To avoid detail not necessary to enable those skilled in the art to practice the invention, the description may omit certain information known to those skilled in the art. Accordingly, the following detailed description is not to be taken in a limiting sense, and the scope of the present invention is defined only by the appended claims.

Figure 1:
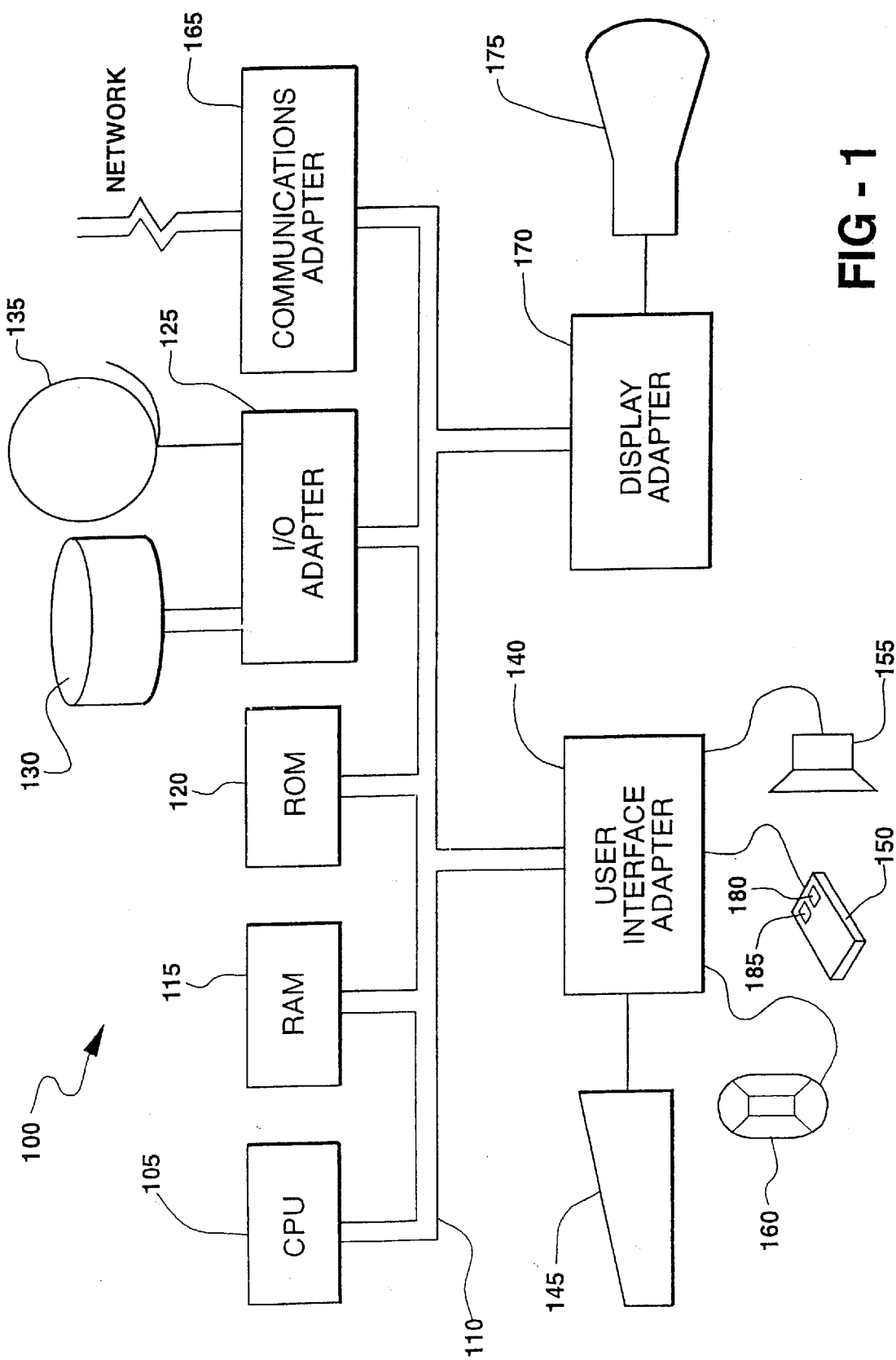
FIG. 1 illustrates a detailed block diagram showing a computer system according to a preferred embodiment of the present invention.

A representative hardware environment for practicing the present invention is depicted in FIG. 1, which illustrates a typical hardware configuration of an information handling system 100 in accordance with the present invention, having a central processing unit (CPU) 105, such as a conventional microprocessor, and a number of other units interconnected via at least one system bus 110. Information handling system 100 may be, for example, a portable or desktop Gateway computer or a Gateway Destination system (Gateway and Destination are trademarks of Gateway 2000, Inc.). Information handling system 100 shown in FIG. 1 includes a random access memory (RAM) 115, a read-only memory (ROM) 120 (wherein the ROM 120 may be erasable programmable read-only memory (EPROM) or electrically erasable programmable read-only memory (EEPROM)), an input/output (I/O) adapter 125 for connecting peripheral devices such as a disk unit 130 and a tape drive 135 to the system bus 110, a user interface adapter 140 for connecting a keyboard 145, a mouse 150, a speaker 155, a microphone 160, and/or other user interface devices to the system bus 110, a communications adapter 165 for connecting information handling system 100 to an information network such as the Internet, and a display adapter 170 for connecting the system bus 110 to a display device such as a monitor 175. A typical mouse 150 has a first button 180 and a second button 185 which may be used to control a cursor (not shown) displayed on the monitor 175.

Figure 2:
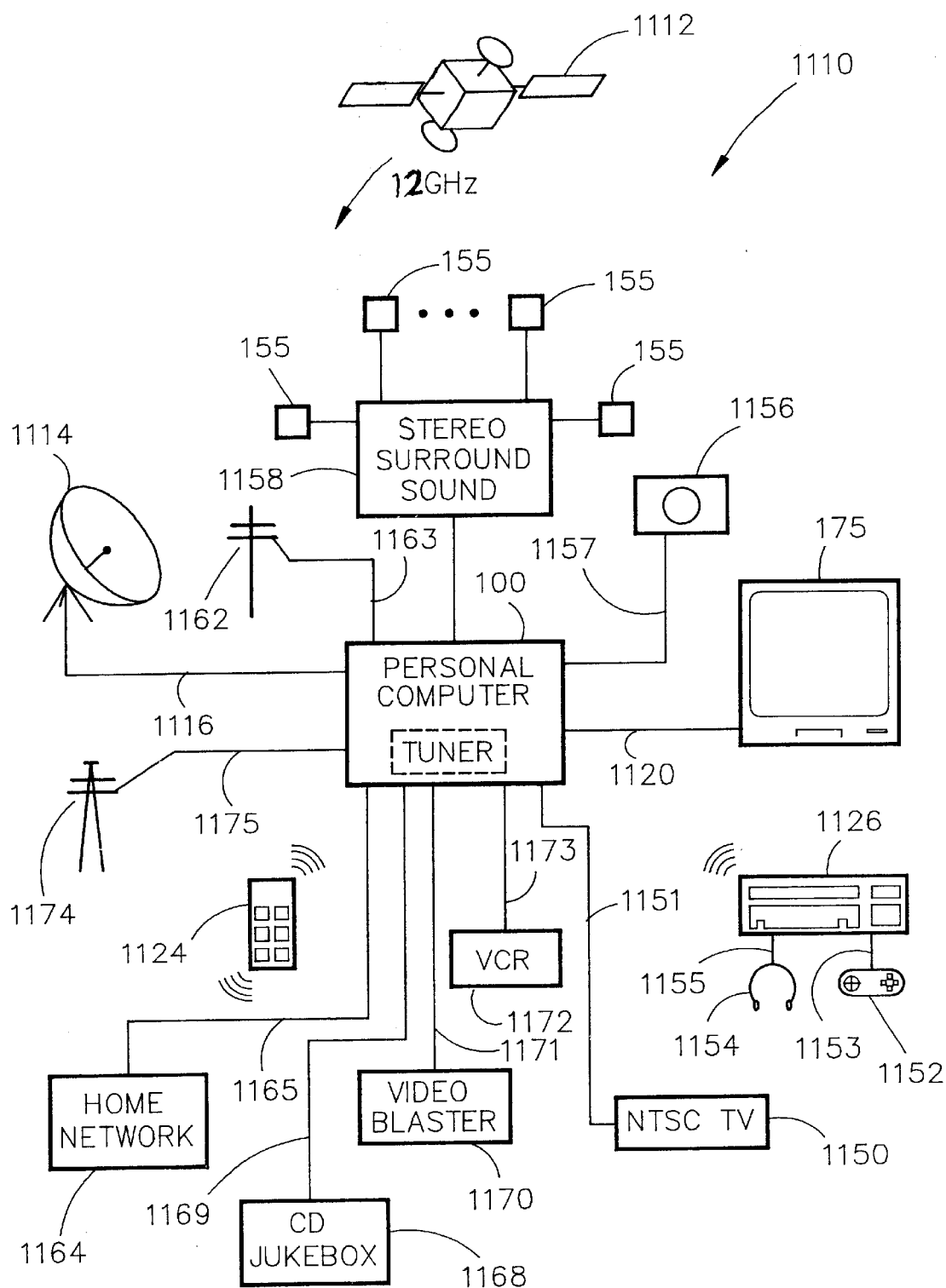
FIG. 2 illustrates a detailed block diagram showing a convergence system according to the preferred embodiment of the present invention.

Referring next to FIG. 2, a system 1110 is shown in general detail. Reference numerals or letters in FIG. 2 which are like, similar, or identical to the reference numerals or letters of FIG. 1 indicate like, similar, or identical components or features. External to system 1110 is satellite 1112 which, in one preferred embodiment, is an HS601 model operated by Hughes at a 101 degree west longitude geosynchronous orbital location. Satellite 1112 transmits signals comprising 150 channels of modulated digital video, audio, and data at a frequency of about 12 GHz. The satellite signals are received by system 1110 by antenna 1114 containing a low noise block converter amplifier. Antenna 1114 is preferably about 18 inches in diameter and receives left-and right-hand circularly polarized signals between 12.2 and 12.7 GHz. Antenna 1114 provides a "downconverted-spectrum" signal between 950 and 1450 MHz via a coaxial cable or other suitable communication medium 1116 to information handling system 100, such as a personal computer or other system or circuitry capable of processing data. Suitable antennas 1114 are already being manufactured and sold by RCA Corporation by direct sales and through numerous major retail chains such as Radio Shack.

System 100 contains circuitry and software to further process signals from the antenna, generally demodulating and decoding the signal to produce a VGA (video graphics adapter) signal. The VGA signal is provided via a standard VGA compatible monitor cable 1120 to drive a large screen, data quality, monitor 175 suitable for viewing in a family room or entertainment room environment. System 100 provides for user input by means of remote controls 1124 and/or 1126. Remote control 1124 comprises a hand-held size device with standard television controls and a numeric keypad and, in one embodiment, VCR (video cassette recorder) controls and a pointing device. The remote control 1124 provides RF (radio frequency) or IR (infrared) control signals for reception by system 100. Remote control 1126 is a full function personal computer keyboard, with additional standard television and VCR controls, and a pointing device (preferably in the form of a touchpad). Remote control 1126 also is capable of providing RF control signals to system 100. RF control signals are preferred over IR or hardwired control in a preferred embodiment due to the home entertainment environment. Monitor cable 1120 is a standard type cable typically used on VGA display devices and comprises up to 15 electrical conductors that interface with monitor 175 in a D-series shell connector. In one embodiment, full multi-media sourcing and destinationing of audio/video/data (A/V/D) broadcast is provided for. Although the embodiment presented herein discusses the use of VGA signals, it should be mentioned that with an appropriate change in hardware, NTSC (National Television Standards Committee) signals and NTSC capable hardware will employ the present invention in the manner mentioned herein.

Information handling system 100 may include a tuner, tuner circuitry, or card capable of both tuning to multiple channels and receiving television information or signals in the form of the NTSC or PAL (Phase Alteration Line) forms from any medium such as from a cable system or from a digital satellite system. One embodiment of medium 1116 carrying signals from satellite dish 1114 provides digital A/V/D signals from such sources as DirectTV or Primestar (DirecTV is a trademark of DirecTV, Inc., and Primestar is a trademark of Primestar Partners, L.P.). In another such embodiment, the signals carried on medium 1116 provides analog A/V such as NTSC antenna signals. In another such embodiment, the signal carried on medium 1157 from camera 1156 provides analog A/V such as NTSC audio/video signals. In further embodiments, the signal carried on medium 1175 from cable-data source 1174 provides analog and/or digital. A/V/D. In further such embodiments, the signal carried on medium 1163 from PSTN (Public Switched Telephone Network) 1162 provides data or phone signals such as ISDN (integrated services digital network) or POTS (plain old telephone system) signals. In one set of such embodiments, system 100 is programmed to automatically record analog signals, such as television programming, onto recordable media, such as a video tape in VCR 1172 coupled to cable 1173. In another such set of embodiments, system 100 is programmed to automatically record digital signals, such as digital television programming, DVD (Digital Versatile Disk) programming, or CD-ROM (Compact Disk—Read-Only Memory) type audio, onto recordable media, such as recordable compact disks, in a CD/DVD jukebox 1168 coupled to cable 1169. CD/DVD jukebox 1168 also plays CDs, CD-ROMs or DVDs for use elsewhere. In another such embodiment, signals are sent to stereo surround sound system 1158 for audio output to one or more speakers 155, and on cable 1151 to TV 1150. In one such embodiment, earphones 1154 on cable 1155 and gamepad 1152 on cable 1153 provide additional input/output through remote control 1126. Home network 1164 is "smart wiring" used to transmit data and control within the home, coupled by cable 1165 to system 100. Videoblaster 1170 provides video signal processing on cable/connector 1171. Cables 1175, 1116, 1163, 1157, 1151, 1173, 1171, 1169, 1155 and 1153 maybe wired coupling or wireless, such as RF or IR.

One example of convergence system 1110 is the Destination System using the DestiVu user or media interface manufactured and sold by Gateway 2000, Inc. In this manner, convergence system 1110 is a fully functional computer integrated with a television, providing TV viewing (via broadcast, cable, satellite, VCR, digital disk, or other broadcast media) and personal computing functionality. This convergence of computer and television enables a user the combined access to both television programs and information, computer related functionality such as computer information and programs, and Internet access.

Although many of today's televisions employ much of the same hardware resources employed by computers, such as information handling system 100, it is possible that the present invention might be practiced in other electronic devices or networked electronic devices. For example, with the development of audio/video networking, such as the recently proposed HAVi standard, television sets or other audio/video devices, such as audio/video receivers and VCRs, that do not themselves contain such resources, could implement the present invention by using the resources of other devices on a network.

Figure 3:
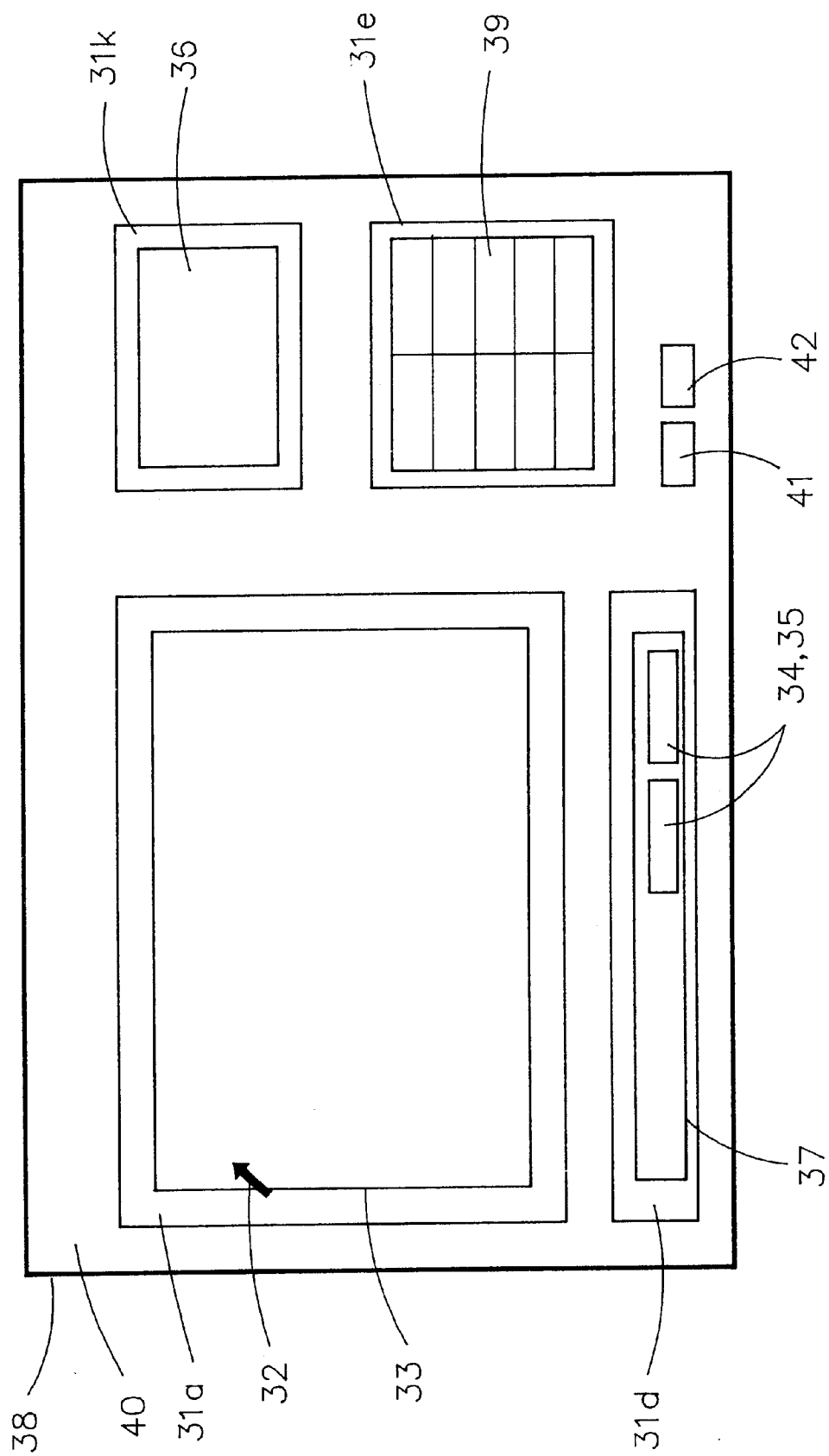
FIG. 3 illustrates a graphical user interface according to a preferred embodiment of the present invention.

Referring now to FIG. 3, an illustration of a Graphical User Interface (GUI) 38 according to the preferred embodiment of the present invention is shown, wherein reference numerals or letters which are identical to reference numerals or letters in FIG. 1–2 indicate like, similar, or identical components or features. FIG. 3 is an illustrated view of an operating system's GUI as displayed on the display device 175 in accordance with the present invention. The operating system shown in FIG. 3 is DestiVu by Gateway 2000, Inc., but the present invention will work with other operating systems such as Windows 95 or Windows 98 (Windows 95 and Windows 98 are trademarks of Microsoft Corporation), or any other GUI. The GUI 38 includes a cursor 32, a desktop 40, two icons 41, 42, a window 31a with a schedule 33 containing program schedule information, a window 31b containing additional program information 36, a window 31c containing an event menu 39, and a dialog box 31d containing a user dialog 37 with user response prompts 34, 35 all of which are well known in the art.

Figure 3A:
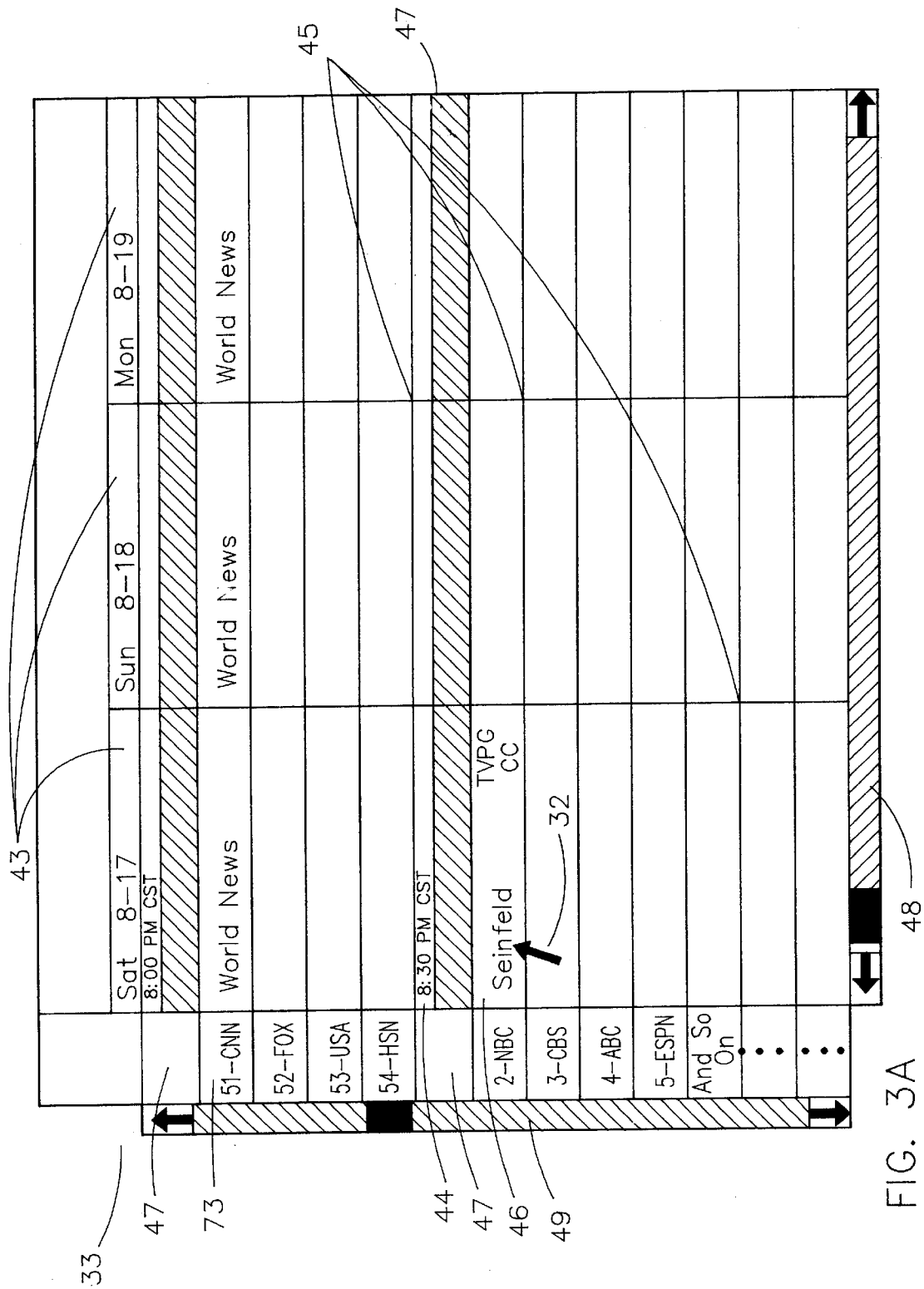
FIG. 3A illustrates a display window containing program scheduling information according to a preferred embodiment of the present invention.

FIGS. 3A–E are illustrations of windows contained within GUI 38 and are displayed using display device 175 and are one representation of displaying windows within GUI 38 where the windows may be created using a plurality of methods with the underlying functionality and information provided by the windows remaining in tact. Referring now to FIG. 3A, a further illustration of FIG. 3 according to the preferred embodiment of the present invention is shown, wherein reference numerals or letters which are identical to reference numerals or letters in FIGS. 1–3 indicate like, similar, or identical components or features. In FIG. 3A, an illustration of a schedule containing program scheduling information is shown. The schedule 33 comprises a grid 45 configured to display the program scheduling information and includes the network name and channel 73 for each of the networks, wherein the network name and channel may also include Internet addresses (not shown), along the left-hand side of grid 45 and the days and dates of the week. 43 being displayed on the top row of grid 45. The grid 45 is also configured to display the program name 46 and program information for program name 46. The grid 45 also contains a mini-header 47 separating each of the time slots 44 within grid 45 for the networks displayed. Vertical and horizontal scroll bars, 49 and 48 respectively, are used to access the information within grid 45. For example, if the user wanted to display what was to be shown on Saturday, August 17 at 8:30 P.M., the user would use mouse 150 and mouse buttons 180, 185 to move cursor 32 in a known manner to scroll the vertical and horizontal scroll bars until the desired information is displayed. It can be appreciated by those skilled in the art that the schedule 33 and information contained therein may be organized in a plurality of ways to effectively display the program scheduling information, and the organization of the information contained within schedule 33 is not limiting to the invention, but rather, is shown a preferred representation of displaying program scheduling information.

It is to be understood that the term "network" is used throughout this disclosure in a broader sense than the usual meaning given to the term "network". In other words, the use of the term network is not limited to broadcasting companies that broadcast to a network of affiliates throughout the country. Rather, the term network is used loosely to describe different programming entities that occupy different channels in a viewing spectrum, regardless of whether these programming entities, for example, broadcast to a network of affiliates or only to a local cable station.

Figure 3B:
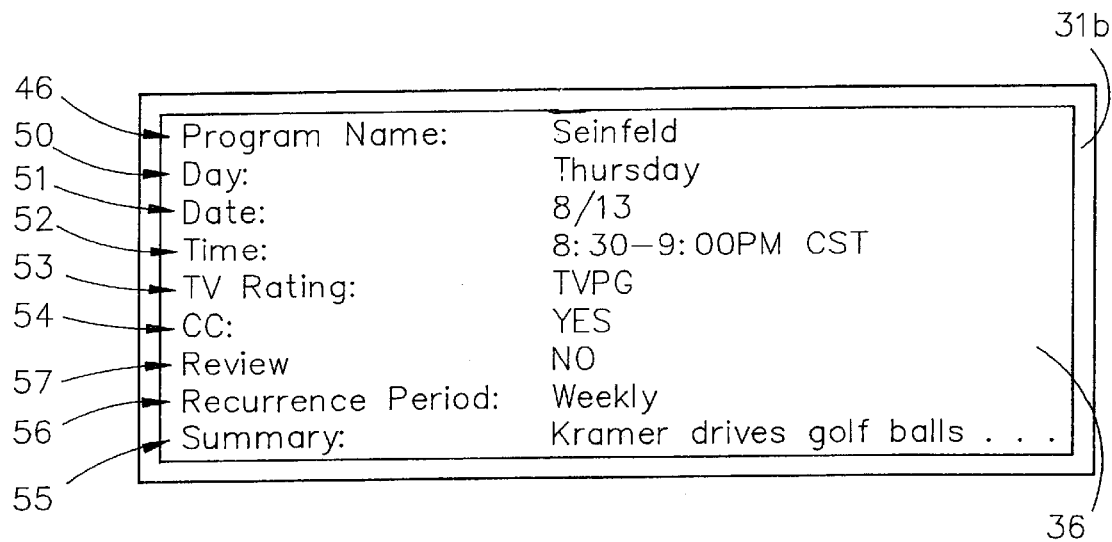
FIG. 3B illustrates a display window containing program information according to a preferred embodiment of the present invention.

FIG. 3A illustrates cursor 32 pointing to program name 46 such that cursor 32 may be used to select program name 46. The selecting of program name 46 provides additional program information illustrated by FIG. 3B. FIG. 3B is an illustration of additional program information associated with program name 46 according to the preferred embodiment of the present invention, wherein reference numerals or letters which are identical to reference numerals or letters in FIGS. 1–3, 3A indicate like, similar, or identical components or features. The program information 36 displayed in window 131b of GUI 38 contains the program name 46, as well as the day 50, date 51, and time 52 that the program name 46 airs. Additional information shown is the program rating 53, whether the program is closed captioned for the hearing impaired 54, and a brief summary 55 describing the episode of program name 46. Also included is whether the program name 46 has already aired once, making it a rerun 57, and the recurrence period 56. As can be appreciated by those skilled in the art, any combination of program scheduling information can be displayed within window 3 1b. Additionally, the program scheduling information need not be displayed in a separate window as illustrated in FIG. 3B. In alternate embodiments, the information may be contained within schedule 33 or could be displayed using a pop-up window within GUI 38 or may not be displayed at all. Displaying the program scheduling information for the selected program is shown not in a limiting sense but to cite one example of program scheduling information associated with a program in the preferred embodiment of the present invention.

Figure 3C:
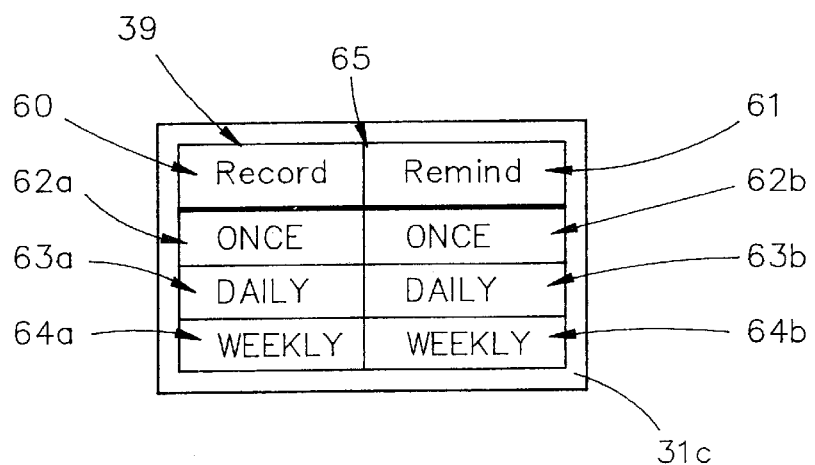
FIG. 3C illustrates a display window containing a event menu according to a preferred embodiment of the present invention.

Referring next to FIG. 3C, an illustration of an event menu according to the preferred embodiment of the present invention is shown, wherein reference numerals or letters which are identical to reference numerals or letters in FIGS. 1–3, 3A–B indicate like, similar, or identical components or features. Within FIG. 3C is an illustration of event menu 39 contained within window 31c of GUI 38. An event menu is used to select events to be scheduled using a selected program and associated program scheduling information. Contained within event menu 39 are references to record and remind events wherein a record event is an event that has a record function associated with the event, and a remind event is an event that has a remind function associated with the event. Event menu 39 contains an event header 65 with record and remind title bars, 60 and 61 respectively, to describe the events within event menu 39. The record event references a record function that allows the user to schedule a recording of a selected program name 46 using the program scheduling information associated with a selected program as displayed by FIGS. 3A–B.

The remind event references a remind function and utilizes the associated program scheduling information for a selected program to have a reminder sent to the user that a selected program is about to air. The reminder may be in many forms, as can be appreciated by those skilled in the art, including an audible tone, an email, a user prompt, or even the replaying of a pre-recorded message played by a player internal to the information handling system and played by a program contained within Windows 95 or any other type of operating system.

The set of events displayed within event menu 39 are associated with the event titles in header 65, and include a record or remind once, 62a and 62b respectively, a daily record or remind, 63a and 63b respectively, and a weekly record or remind, 64a and 64b respectively. The recurrence periods of each of the events is implied by the names of the events. For instance, a weekly remind event 64b has a recurrence period of one week, and a daily record event 63a has a recurrence period of 24 hours. Additionally, the record and remind once events 62a and 62b have no recurrence period as they are performed only one time. FIG. 3C is one graphical representation of the event menu 39 of the preferred embodiment of the present invention and, in other embodiments, may be organized in a plurality of ways such as horizontally (not shown) or through the use of a pull down function menu (not shown), all of which are well known in the art. It can also be appreciated by those skilled in the art that the event menu may contain a plurality of event types to be used in association with a program, and event menu 39 is not limited to record and remind events.

Figure 3D:
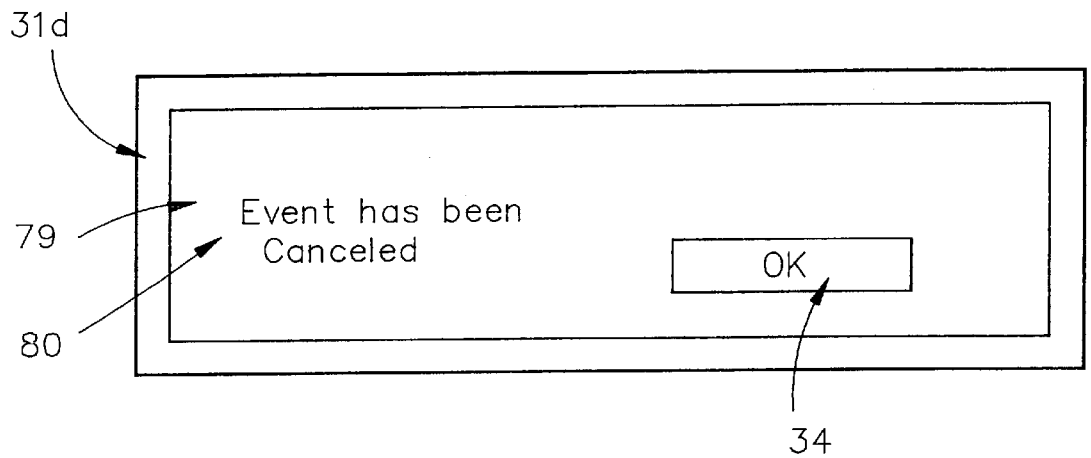
FIG. 3D illustrates a dialog box containing a notice according to a preferred embodiment of the present invention.

Referring now to FIG. 3D, an illustration of a window containing a dialog box is shown. In FIG. 3D, dialog box 31d displayed within GUI 38 comprises a notice 79 containing a message 80 displaying textual information for the user such as a reminder of a program or a notice that an event has been canceled. Dialog box 31d also contains a user response prompt 34 for the user to acknowledge the information sent by system 1110. The dialog box 79 may be displayed in many ways with a virtually unlimited combination of messages and user response prompts as can be appreciated by those skilled in the art.

Figure 3E:
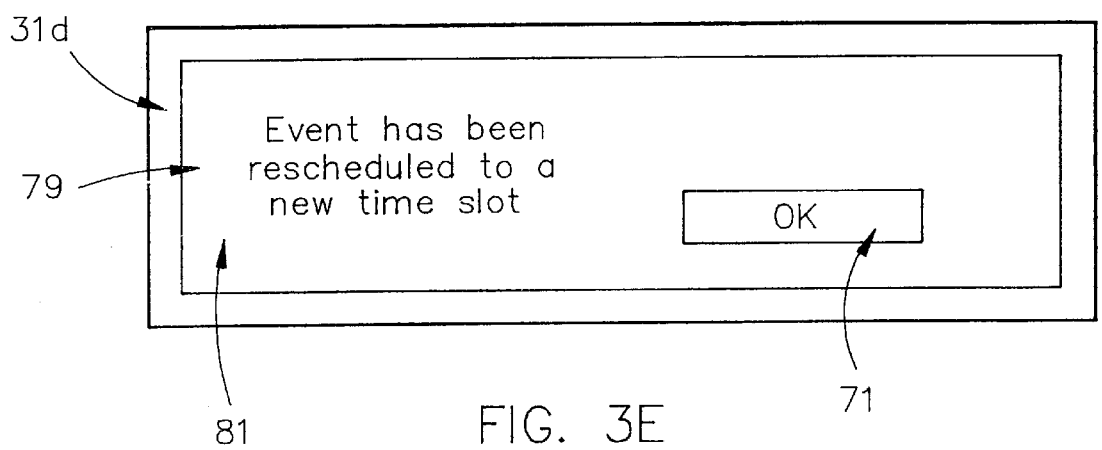
FIG. 3E illustrates another dialog box containing a notice according to a preferred embodiment of the present invention.

Referring now to FIG. 3E, an illustration of another window containing a dialog box is shown. In FIG. 3E, dialog box 31d displayed within GUI 38 contains a notice 79 containing a message 81 displaying textual information notifying the user that a scheduled event has been rescheduled to a new time slot. The dialog box also contains a user response prompt 71 for the user to acknowledge the information sent by system 1110. As noted above, dialog box 79 may be displayed in many ways with a virtually unlimited combination of messages and user response prompts as can be appreciated by those skilled in the art.

Figure 4A:
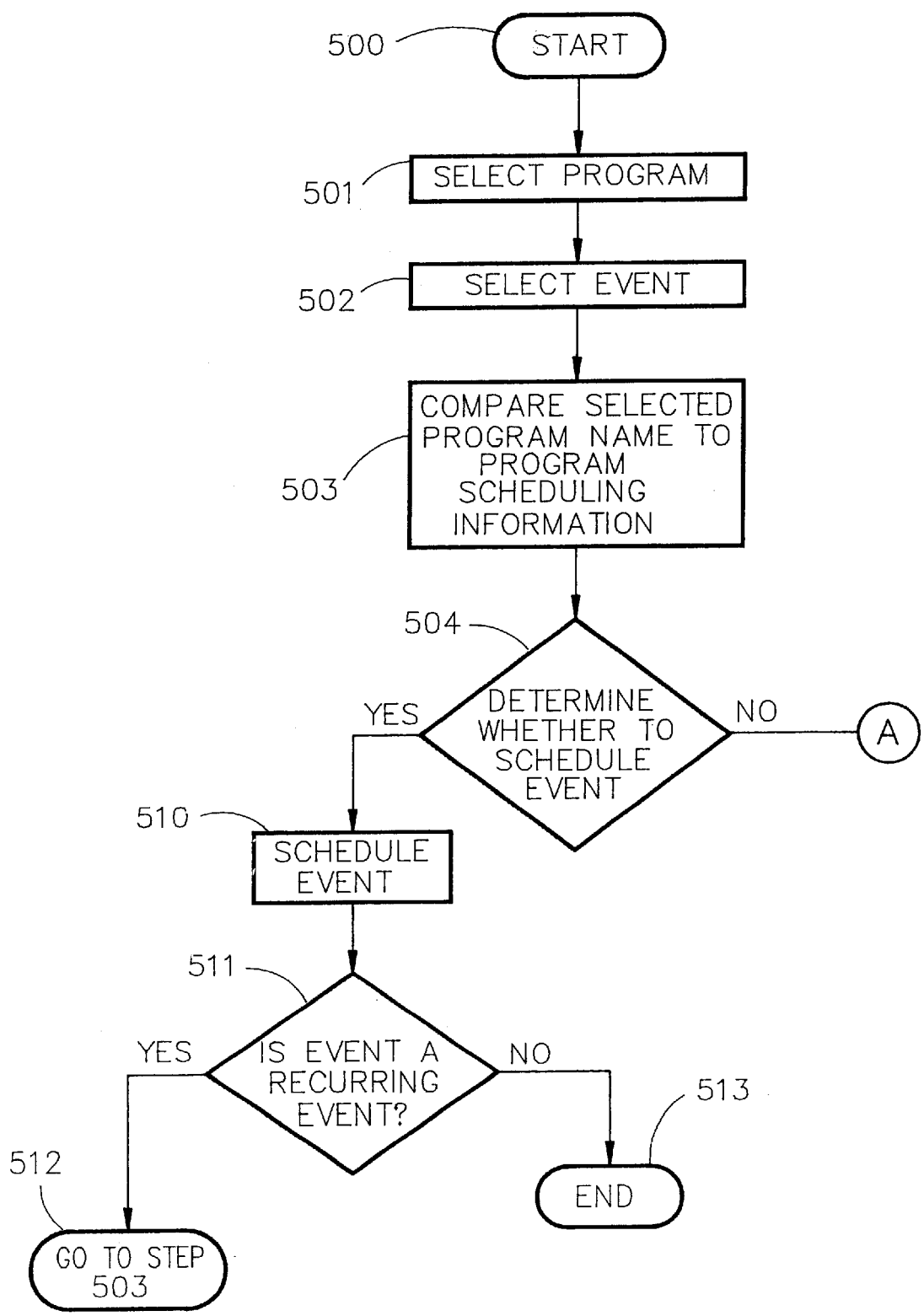
FIG. 4 is a flowchart illustrating a method according to the present invention.
Figure 4B:
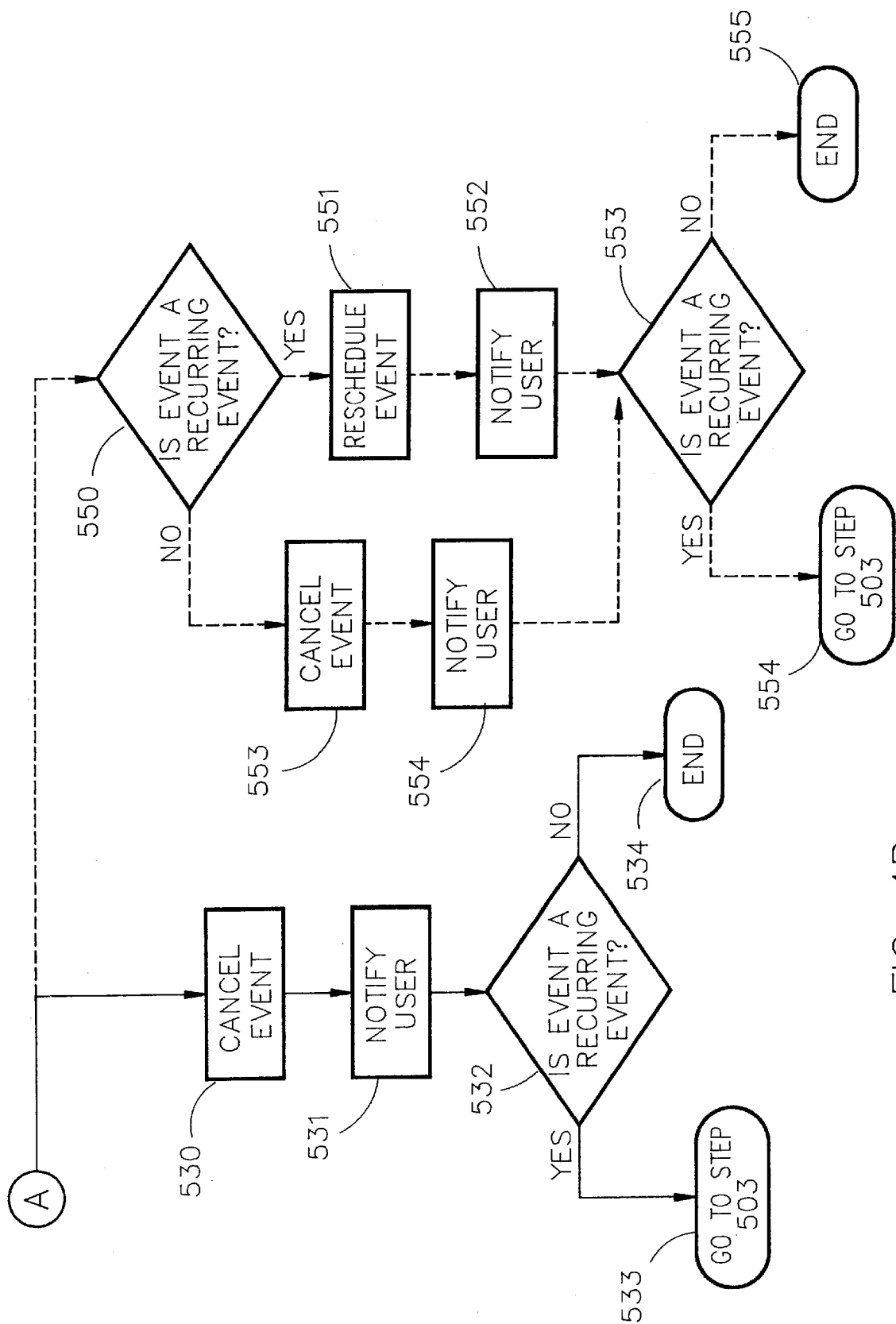

FIG. 4 illustrates a flowchart of a method according to the present invention. In one embodiment, the method illustrated by the flowchart of FIG. 4 is implemented in a program of instructions readable by a computer system having an operating system implementing a graphical user interface as shown in FIGS. 1–3, 3A–E. It will be understood that the flowchart in FIG. 4 is shown only to illustrate one method according to the present invention and that the present invention is not limited by the details of this flowchart. Those skilled in the art can appreciate that alternate embodiments could be added to the method to schedule a plurality of events with a variety of information and functions associated with the events.

The method begins at step 500. At step 501, the user selects a program from schedule 33 containing program scheduling information. In the preferred embodiment of the present invention, the program selected is not limited to programs which air via cable television and may include programs which are received by satellite dish 1114 or even programs that are broadcast via the Internet and received by system 100. Upon the user selecting a program, the method then proceeds to step 502 where the user selects an event to be associated with the selected program. The selection of a program and event to be used in association with the program may be accomplished using mouse 150 and buttons 180 and 185 to control cursor 32 on GUI 38 as displayed on display device 175 of system 100. In alternate embodiments, the cursor 32 may be controlled by the remote control device 1126 to select a program and event, or cursor 32 may be controlled by a user speaking to system 100 via microphone 160 where system 100 contains a program of instructions to recognize speech patterns of a user to control cursor 32. Additionally, the user may select a program and event by communicating through a telecommunications connection of system 100 where voice recognition software within system 100 would allow a user to select a program and events via a remote location such as utilizing a telephone or cellular phone. In another embodiment, selection of programs and events may also be accomplished by another system external to system 100 or events by a program resident on system 100. All in all, the selection of a program and events may be accomplished in a plurality of ways as can be appreciated by those skilled in the art.

In the preferred embodiment of the present invention, upon selecting a program, the user can select an event via event menu 39 where two types of events, record and/or remind events, may be selected to be used in association with the selected program. Event menu 39 illustrates six event types, but alternate embodiments may include a plurality of events to be used in association with the selected program. Each of the events illustrated in event menu 39 contain a reference to a function that will be accessed upon the user selecting a program and further selecting an event to be used in association the program. As noted above, record and remind events may be used in association with the selected program where a record event is an event that may be scheduled to record a program on a future date and utilizes the program scheduling information associated with the selected functions to schedule the event. Likewise, a remind event is an event that may be scheduled to remind the user when the selected program is about to air and utilizes the program scheduling information associated with the selected function to schedule the event. Additionally, in the preferred embodiment of the present invention, the user may select a periodically recurring event to be used in association with the selected program where the recurrence period of a periodically recurring event may be daily, weekly, or any other period. As previously stated, the event types in event menu 39 are not shown in a limiting sense but shown to cite one example of events and functions utilized by the present invention. Other embodiments can include a plurality of additional events and event types to be used in association with a selected program.

Upon selecting an event at step 502, the method then proceeds to step 503 where the program name 46 of the selected program is compared to the program scheduling information. This comparison can occur any time after the selection of a program and event. In the preferred embodiment of the present invention, the comparison will be made shortly before the program airs, ensuring the most current program scheduling information is used. For example, if the program is to air at 7:30 P.M., the comparison may be made at 6:30 PM. Therefore, at step 503 the selected program name is compared to the most current program scheduling information to ensure that the same program name is in the same time slot 52 and the same channel 73. For example, suppose the user selected the Seinfeld program airing on Thursdays between 8:00–8:30 P.M. EST on channel 2. The method would compare the program name "Seinfeld" to the program name in the same time slot and channel to the most current program scheduling information. Upon comparing the program name to the most current program scheduling information, the method then proceeds to step 504 where a determination is made whether to schedule an event based on the comparison made in step 503.

At step 504, upon determining that the selected program is airing in the predetermined time slot and channel, the method proceeds to the "yes" branch of decision tree 504. The method then proceeds to step 510 where the selected event is scheduled. A scheduled event is one which utilizes the program scheduling information for the selected program and the previously selected event to schedule the event. For example, if the user elected to record a selected program one time, the event is scheduled to record the selected program in the predetermined time slot and channel. Accordingly, when the date and time occurs for the scheduled event, the program is recorded.

Upon scheduling the event, the method then proceeds to step 511 where the method determines if the selected event of step 502 is a recurring event (i.e. daily, weekly, etc.). If the event is a recurring event, the method proceeds to step 512 where the method returns to step 503 and repeats. If however, the event is a single event (i.e. record once or remind once) the method proceeds to step 513 where the method terminates.

Referring back to decision tree 504, the alternate path of step 504 is chosen when the name of the selected program is not the same name in the predetermined time slot and channel of the selected program. For example, if the user selected the Frasier program airing Tuesdays from 7:30–8:00 P.M. CST, and the program was preempted by a sporting event, the program name 46 would no longer reside in the predetermined time slot 52 and channel 73. Therefore the "no" branch of decision tree 504 is selected where two embodiments of the present invention reside. The solid line indicates one embodiment where the selected event of step 502 is canceled at step 530. Upon canceling the event, the method proceeds to step 531 where a notice, as illustrated in FIG. 3D, is sent to the user indicating that the event has been canceled.

Upon canceling the event, the method then proceeds to step 532 where the method determines if the selected event of step 502 is a recurring event (i.e. daily, weekly, etc.). If the event is a recurring event, the method proceeds to step 533 where the method returns to step 503 and repeats. If however, the event is a single event (i.e. record once) the method proceeds to step 534 where the method terminates.

At step 504, the dashed line indicates another embodiment of the present invention where the method searches for a selected program name in a different time slot and reschedules accordingly. In this embodiment the method proceeds to step 550 where the method searches for the selected program name in a different time slot of the same E channel. For example, if the Frasier program had been preempted by a sporting event, and the normal time slot of 7:30–8:00 P.M. CST had been rescheduled to 9:30–10:00 P.M. CST, the method would search the program scheduling information for the new time slot and reschedule the event accordingly.

At step 550, upon determining that selected program should be rescheduled, the method proceeds to step 551 where the selected event of step 502 is rescheduled. The method then proceeds to step 552 where a notice, as shown in FIG. 3E, is sent to the user indicating that the event was rescheduled.

Upon rescheduling the event, the method then proceeds to step 553 where the method determines if the selected event of step 502 is a recurring event (i.e. daily, weekly, etc.). If the event is a recurring event, the method proceeds to step 554 where the method returns to step 503 and repeats. If however, the event is a single event (i.e. record once) the method proceeds to step 555 where the method terminates.

However, if at step 550, the selected program name cannot be found on the same channel and within the same day, the method proceeds to step 553 where the event is canceled. The method then proceeds to step 554 where a notice, such as FIG. 3D, is sent to the user indicating that the selected event was canceled. Upon canceling the event, the method then proceeds to step 553 where the method determines if the selected event of step 502 is a recurring event (i.e. daily, weekly, etc.). If the event is a recurring event, the method proceeds to step 554 where the method returns to step 503 and repeats. If however, the event is a single event (i.e. record once) the method proceeds to step 555 where the method terminates.

In another embodiment of the present invention, the method can be modified to include searching for a series of the same program and schedule events based upon comparing the selected program name to program scheduling information. Additionally, the selected program may be airing on several different channels and is not limited to airing on the same channel. For example, a user may select a program that airs on several different channels in several different time slots. The present invention would compare the program name of the selected program to the program scheduling information to ensure the selected program is airing. The method would then schedule an event based upon the validating program information for each time slot.

In one embodiment of the present invention, the program scheduling information may be stored in a database within system 100, such as an electronic program guide (EPG) database. In another embodiment, the program scheduling information can be stored in a remote database or server. For example, the program information can be stored on a server that can be accessed via the Internet. In another embodiment, the program information can be broadcast to system 100 whereupon receipt of the program scheduling information the selected program is compared to the received program scheduling information prior to scheduling an event.

In one embodiment of the present invention, system 100 can verify if a program is stored within system 100 prior to scheduling an event. For example, a user may not be aware that a selected program is stored within CD/DVD jukebox 1168. System 100 can verify that a copy of the program does not exist prior to scheduling an event, such as a record event.

In another embodiment, the episode number of a program may be stored within system 100 annotating that a particular episode of a program has been recorded. One skilled in the art can appreciate that a plurality of methods can be deployed to verify if a program is stored within system 100 prior to enabling a scheduling an event without departing from the scope of the present invention.

In another embodiment of the present invention, the program scheduling information is not limited to the information previously shown. As can be appreciated by those skilled in the art, the present invention can incorporate a plethora of different types of program scheduling information as new information types become available. Therefore, the present invention is not limited to present availability of information types and may be modified to utilize future developed program scheduling information.

Although an embodiment of the present invention has been shown and described in detail herein, along with certain variants thereof, many other varied embodiments that incorporate the teachings of the invention may be easily constructed by those skilled in the art. In alternate embodiments, the method may include a search of several channels to find a program name contained within the program scheduling information and schedule events accordingly. Additionally, more than one event may be associated with a selected program providing a cornucopia of scheduled events for the selected program. As mentioned in the method above, the program name is compared to the program scheduling information to determine whether to schedule an event, but it can be appreciated by those skilled in the art that a comparison of additional information, such as a program identification number, or rerun information 57 or TV ratings 53, may be added to or substituted for the method to further enhance the present invention. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is having a set of instructions resident in the random access memory 115 of one or more computer or information handling systems configured generally as described in FIGS. 1–4. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer or encoded or embodied in a signal, such as an analog and/or digital signal, embodied in a propagation medium and transmitted over the propagation medium by a user. The propagation medium may include a local area network or a wide area network, such as the Internet, or other propagation medium. The signal may be propagated through an air medium and transmitted/received by a satellite, antenna, or other device and transferred from/to the computer or information handling system of the preferred embodiment. The signal may be a composite signal comprising a carrier signal carrying the desired information, such as a computer program instruction, which may be downloaded when desired by the user. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

What is claimed is:

1. A method, in a system having program scheduling information, comprising the following steps:

selecting a program from said program scheduling information;

verifying that said program has not already been stored in said system; and if it is verified that said program has not already been stored in said system, then comparing a program identifier for said selected program to said program scheduling information; and if it is verified that said program has not already been stored in said system, determining whether to schedule at least one event for said selected program for at least one predetermined time slot based upon results of comparing said program identifier for said selected to said program scheduling information.

2. The method, as recited in claim 1, wherein said determining step further includes scheduling at least one event for said predetermined time slot if said program scheduling information indicates said program identifier in said predetermined time slot.

3. The method, as recited in claim 2, wherein said at least one event is a periodic recurring event, said periodic recurring event including a periodic recurring function.

4. The method, as recited in claim 2, wherein said at least one event is a record event, said record event including a record function.

5. The method, as recited in claim 2, wherein said at least one event is a remind event, said remind event including a remind function.

6. The method, as recited in claim 1, wherein said determining step further includes rescheduling at least one event for at least one new time slot if said program scheduling information indicates said program identifier in at least one time slot different than said predetermined time slot.

7. The method, as recited in claim 6, further including notifying a user of said rescheduling of at least one event.

8. The method, as recited in claim 6, wherein said rescheduling further includes rescheduling at least one event within the same day as said predetermined time slot.

9. The method, as recited in claim 6, wherein said rescheduling includes rescheduling at least one event for the same channel as said predetermined time slot.

10. The method, as recited in claim 1, wherein said determining step further includes canceling said at least one event based upon results of comparing said program identifier for said selected program to said program scheduling information.

11. The method, as recited in claim 10, further includes notifying a user that said at least one event has been canceled.

12. The method, as recited in claim 1, wherein said program scheduling information comprises a program day, a program date, a program identifier, a program channel, a program air time and a program duration.

13. The method, as recited in claim 12, wherein said program scheduling information further consists of one or more of the following:

recurrence period;

episode description;

episode number;
closed caption information;
ratings information;
web address information;
hyperlinks;
internet information;
simulcast information;
audio format information;
subtitle information;
original film format information;
multiple view angle information; or
foreign subtitle information.

14. The method, as recited in claim 1, further including the step of selecting at least one event for said selected program.

15. The method, as defined in claim 1, wherein said program scheduling information is stored within an electronic program guide database.

16. A system comprising:
at least one processor;
memory operably coupled to said processor; and
a user interface comprising program scheduling information configured for enabling a user to select a program from said program scheduling information; and said system capable of comparing a program identifier for said selected program to said program scheduling information, verifying if the program has already been stored in the system; and, if it is verified that the program has not already been stored in the system, determining whether to schedule at least one event for said selected program for at least one predetermined time slot based upon results of comparing said program identifier for said selected program to said program scheduling information.

17. The system, as defined in claim 16, further comprising:
a display means capable of displaying a cursor, and
a cursor control device capable of controlling said cursor on said display means.

18. The system, as recited in claim 17, wherein said user interface is further configured for enabling, the user to schedule at least one event for said predetermined time slot if said program scheduling information indicates said program identifier in said predetermined time slot.

19. The system, as recited in claim 18, wherein said user interface is further configured to include a periodic recurring event having an associated periodic recurring function.

20. The system, as recited in claim 18, wherein said user interface is further configured to include a record event having an associated record function.

21. The system, as recited in claim 18, wherein said user interface is further configured to include a remind event having an associated remind function.

22. The system, as recited in claim 18, wherein said user interface is further configured to reschedule said at least one event for at least one new time slot if said program scheduling information indicates said program identifier in at least one time slot different than said predetermined time slot.

23. The system, as recited in claim 22, wherein said user interface is further configured to notify the user of said rescheduling of said at least one event.

24. The system, as recited in claim 18, wherein said user interface is further configured to include canceling said at least one event based upon said results of comparing said program identifier for said selected program to said program scheduling information.

25. The system, as recited in claim 24, wherein said user interface is further configured to notify the user of said cancellation of said at least one event.

26. The system, as recited in claim 16, wherein said program scheduling information comprising a program day, a program date, a program identifier, a program channel, a program air time and a program duration.

27. The system, as recited in claim 26, wherein said program scheduling information further consists of one or more of the following:
recurrence period;
episode description;
episode number;
closed caption information;
ratings information;
web address information;
hyperlinks;
internet information;
simulcast information;
audio format information;
subtitle information;
original film format information;
multiple view angle information; or
foreign subtitle information.

28. A computer readable medium tangibly embodying a program of instructions, said program of instructions implementing the following:
taking a selected program from program scheduling information;
comparing a program identifier for said selected program to said program scheduling information;
verifying if the program has already been stored;
if it is verified that the program has not already been stored in the system, determining whether to schedule at least one event for said program for at least one predetermined time slot based upon results of comparing said program identifier for said selected program to said program scheduling information; and
if it is verified that the program has not already been stored in the system, scheduling at least one event for said predetermined time slot if said program scheduling information indicates said program identifier in said predetermined time slot or rescheduling at least one event for at least one new time slot if said program scheduling information indicates said program identifier in at least one time slot different than said predetermined time slot.

29. A signal embodied in a propagation medium, said signal comprising:
at least one instruction capable of selecting a program from program scheduling information;
at least one instruction capable of comparing a program identifier for said selected program to said program scheduling information;
at least one instruction capable of verifying if the selected program has already been stored;
at least one instruction configured to determine whether to schedule at least one event for said program for at least one predetermined time slot based upon results of comparing said program identifier for said selected program to said program scheduling information, and at least one instruction configured to reschedule at least one event for at least one new time slot if said program scheduling information indicates said program identifier in at least one time slot different than said predetermined time slot.

30. The method of claim 1, wherein the step of selecting a program from said program scheduling information occurs is accomplished through audio input.

31. The method of claim 30, wherein the audio input occurs from a voice transmitted through a phone.

32. The method of claim 12, wherein said program scheduling information further consists of one or more of the following:

closed caption information;

simulcast information;

audio format information;

subtitle information;

original film format information;

multiple viewing angle information; or foreign subtitle information.

33. The method of 12, wherein said program scheduling information further consists of one or more of the following:

closed caption information;

subtitle information; or foreign subtitle information.

34. The method of claim 12, wherein said scheduling information further includes audio format information.

35. The method of claim 16, wherein the memory includes a CD/DVD jukebox.

36. A method, in a system having program scheduling information, comprising:

selecting a program from said program scheduling information;

comparing a program identifier for said selected program to said program scheduling information;

determining whether to schedule at least one event for said selected program for at least one predetermined time slot based upon results of comparing said program identifier for said selected program scheduling information;

rescheduling the at least one event for at least one new time slot if said program scheduling information indicates said program identifier is in at least one time slot and not in said predetermined time slot; and notifying a user if the at least one event is rescheduled.

37. A system comprising:

at least one processor;

memory operably coupled to said processor; and a user interface comprising program scheduling information configured for enabling a user to select a program from said program scheduling information; and said system capable of comparing a program identifier for said selected program to said program scheduling information, determining whether to schedule at least one event for said selected program for at least one predetermined time slot based upon results of comparing said program identifier for said selected program to said program scheduling information, rescheduling the at least one event for at least one new time slot if said program scheduling information indicates said program identifier is in at least one time slot and not in said predetermined time slot, and notifying the user if the at least one event is rescheduled.

* * * * *